(12) United States Patent
Roth

(10) Patent No.: US 9,280,759 B2
(45) Date of Patent: Mar. 8, 2016

(54) METHOD AND SYSTEM FOR DISPLAYING PLURAL NOTIFICATIONS FROM PLURAL SOURCES

(75) Inventor: Joshua Roth, Pacific Palisades, CA (US)

(73) Assignee: Blackboard Inc., Washington, DC (US)

(*) Notice: Subject to any disclaimer, the term of this patent is extended or adjusted under 35 U.S.C. 154(b) by 738 days.

(21) Appl. No.: 12/388,452

(22) Filed: Feb. 18, 2009

(65) Prior Publication Data

US 2010/0162114 A1 Jun. 24, 2010

Related U.S. Application Data

(60) Provisional application No. 61/140,813, filed on Dec. 24, 2008.

(51) Int. Cl.
*G06F 3/048* (2013.01)
*G06Q 10/10* (2012.01)

(52) U.S. Cl.
CPC .............. *G06Q 10/10* (2013.01); *G06F 3/048* (2013.01)

(58) Field of Classification Search
CPC ... H04M 2242/04; G08B 27/00; G06F 3/048; G06Q 10/10
USPC .......................................................... 715/772
See application file for complete search history.

(56) References Cited

U.S. PATENT DOCUMENTS

| | | | |
|---|---|---|---|
| 2005/0240378 A1* | 10/2005 | Smith et al. | 702/188 |
| 2006/0058953 A1* | 3/2006 | Cooper et al. | 701/208 |
| 2007/0096894 A1* | 5/2007 | Lemmon | 340/506 |
| 2007/0293240 A1* | 12/2007 | Drennan | 455/456.1 |
| 2008/0070546 A1* | 3/2008 | Lee | 455/404.2 |
| 2008/0070593 A1* | 3/2008 | Altman et al. | 455/457 |
| 2008/0254811 A1* | 10/2008 | Stewart | 455/456.2 |
| 2009/0309742 A1* | 12/2009 | Alexander et al. | 340/601 |
| 2010/0088718 A1* | 4/2010 | Hasek et al. | 725/33 |
| 2011/0002259 A1* | 1/2011 | Schultz et al. | 370/316 |

* cited by examiner

*Primary Examiner* — Angie Badawi
(74) *Attorney, Agent, or Firm* — McDermott Will & Emery LLP

(57) ABSTRACT

A system for displaying at least one notification from at least one source includes a processor configured to access the at least one notification from the at least one source, the at least one notification comprising content and geographical information. The processor is further configured to display the notification on a map based on the geographical information of the notification. A method for displaying at least one notification from at least one source is also provided.

17 Claims, 7 Drawing Sheets

METHOD AND SYSTEM FOR DISPLAYING PLURAL NOTIFICATIONS FROM PLURAL SOURCES

CROSS-REFERENCE TO RELATED APPLICATIONS

This application claims priority to U.S. Provisional Patent App. No. 61/140,813, filed on Dec. 24, 2008, the entire contents of which are herein incorporated by reference.

BACKGROUND

1. Field

The present disclosure relates to the display of notifications, and more particularly, to methods and systems for displaying at least one notification from at least one source.

2. Background

Businesses and governmental entities, including municipalities and schools, are ever more reliant on communicating through the mass transmission of notifications to their staff, citizens and family members of students to keep these constituencies apprised of important events, and sometimes of emergencies. Such mass transmission may be handled using a mass transmission system. For example, a school principal might need to inform the parent of every child that the school will be closed the next day due to some unforeseen event such as flooding, fire, or freezing conditions. Such notifications might be sent to telephones, facsimiles, pagers, electronic mail (e-mail), and/or text messages. These notifications will typically vary in their degree of importance, in the number of recipients, or in the immediacy with which they must be sent.

However, there currently exists a growing problem as mass notification transmission systems become more prevalent. In particular, the personnel responsible for the oversight (e.g., command and control) of various notifications typically do not know what other institutions and agencies may be communicating to their constituents, and with what information. This problem has the potential to create duplicate pieces of information, inaccurate or misinformation, an overload of information, and/or outdated information for dissemination out to the various constituents.

Thus, there is a need for notification systems and methods by which the foregoing problems may be avoided.

SUMMARY

Disclosed embodiments describe systems and methods for displaying notifications from different sources. Certain disclosed embodiments provide for aggregation of notifications on a single display, based on geographical information associated with each notification.

In one aspect of the disclosure, a system for displaying plural notifications from plural sources is provided. The system includes a processor configured to access the plural notifications from the plural sources, the plural notifications comprising content and geographical information. The processor is further configured to display the notification on a map based on the geographical information of the notification.

In a further aspect of the disclosure, a method for displaying plural notifications from plural sources is provided. The method includes accessing the plural notifications from the plural sources, the plural notifications comprising content and geographical information. The method further includes displaying the notification on a map based on the geographical information of the notification.

In yet a further aspect of the disclosure, a machine-readable medium encoded with instructions for displaying plural notifications from plural sources is provided. The instructions include code for accessing the plural notifications from the plural sources, the plural notifications comprising content and geographical information. The instructions further include code for displaying the notification on a map based on the geographical information of the notification.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

With reference to the drawings, which are provided by way of exemplification and not limitation, there are disclosed embodiments for displaying notifications from at least one source. More specifically, the accessing of notifications from at least one source and the display of the notifications based on geographical information associated with each notification is disclosed.

Figure 1:
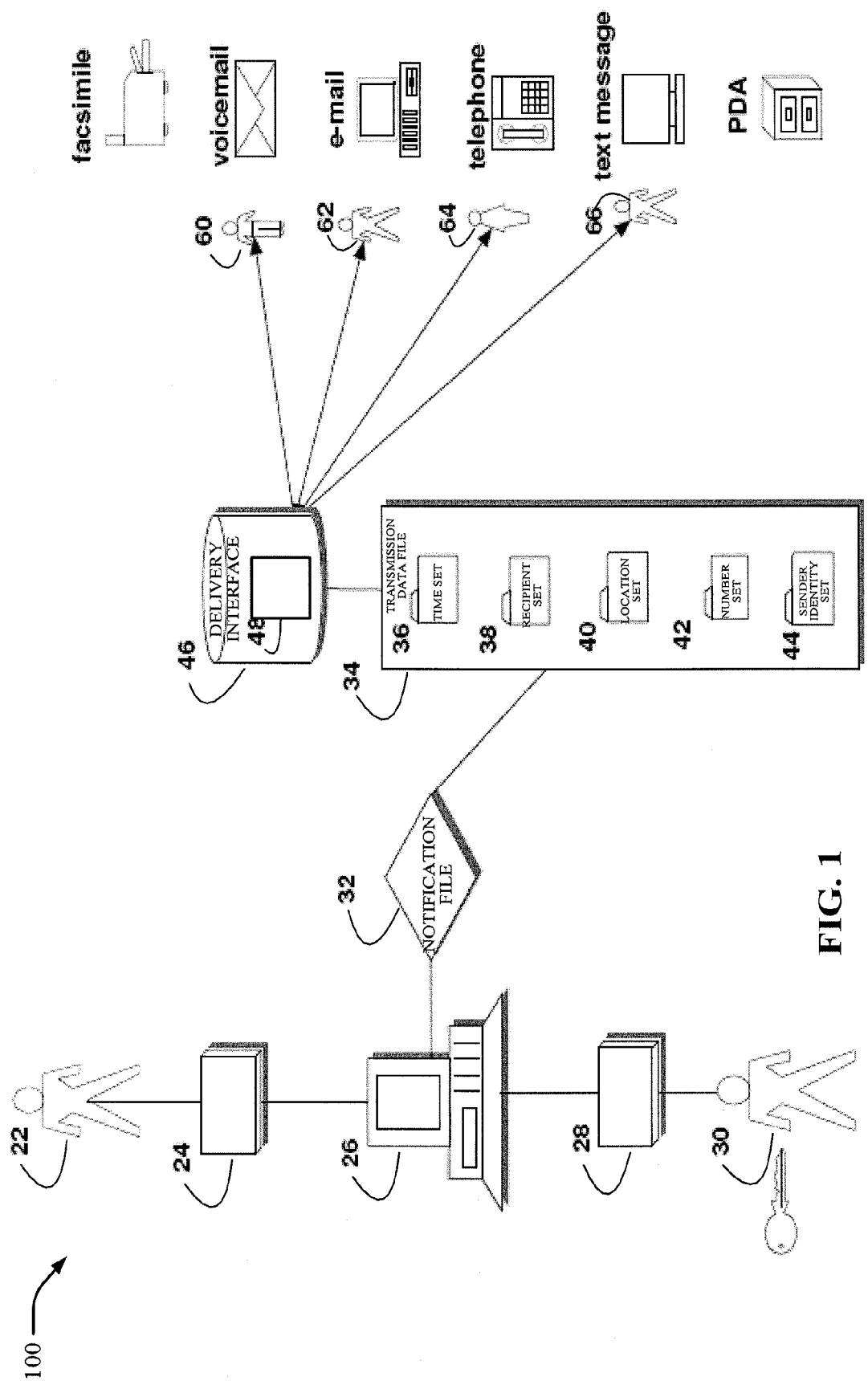
FIG. 1 is a diagram illustrating an example of a mass notification transmission system.

FIG. 1 is a diagram illustrating an example of a mass notification transmission system. As can be seen in FIG. 1, a CPU or central processing unit 26 forms a core component of the mass notification transmission system 100. The CPU 26 is preconfigured to receive a notification from a user 22, or initiator, of the mass notification transmission system 100 who may wish to send that notification to a large number of recipients. The user 22 will normally have acquired the right to send a notification into the CPU 26 by earlier entering into a contract with the management of the system, entering his name on a list of legitimate users, paying the required fee if appropriate, and acquiring an entry code. The notification the user 22 sends to the CPU 26 may be sent in any one of a number of different formats via a transmission interface 24. It should be noted that a system administrator 30 may also send a notification via a different transmission interface 28. Transmission interface 24 and/or 28 may be, for example, an ordinary land telephone, a cell phone, a computer for sending email, a computer with an internet connection, or it may be a facsimile machine for sending faxes, or the like.

As an example, a notification might be: "Please clear your brush before fire season." The selected recipients might be a group of residents who live within a fire zone. The time and date to send might be tonight at 7:00 pm, and the methods of transmission to recipients selected by the user might include telephone and e-mail delivery. These choices are exemplary.

Once the notification is received from the user 22 by the CPU 26, it is stored by the CPU 26, in a local or remote memory associated with the CPU 26, as a notification file 32. The notification file 32 may be associated with a transmission data file 34 for later use, as set forth more fully below. Firstly, it may be noted that if the notification received is an ordinary voice notification via an interface 24 which is a telephone, the analogue voice signal may be converted to a digital sound file such as a .wav file and stored by the CPU 26 as such. If the notification received via the interface 24 is an email or a submission to a website, it may be stored by the CPU 26 as a .txt file, but it may also be converted to a sound file using TTS (text-to-speech) software. If the notification is received as facsimile, it may be stored by the CPU 26 as a .pdf file. All of these are stored pending distribution to the appropriate recipients in the appropriate form.

Once the notification file 32 is stored by the CPU 26, it is associated with the transmission data file 34 which is structured to include one or more of a number of data sets 36-44 that will later assist in controlling the transmission of the notification file 32. For example, the user 22 may insert information into the data sets 36-44 by entering key strokes (telephone key, computer key, etc.) in response to queries from the CPU as to what information should be entered in the data sets 36-44. The data sets 36-44 will then be associated with the notification file 32, as described. The information in the data sets 36-44 may be as follows: A time set 36 contains information relating to the time (e.g., date and time of day) the notification is scheduled for distribution. A recipient set 38 contains information relating to the class of recipients the notification is intended to reach. For example, the recipients may be all the parents of students at a school between 6th and 8th grades. A location set 40 contains information relating to the geographical locations the notification is intended to reach. For example, the intended recipients may be all the residents in a town living on one side of a river, or next to a combustible forest. Further data sets may be generated from information provided in preceding sets. For example, a number set 42 may be generated by the CPU 26 from the information entered into the recipient set 38, wherein the CPU 26 calculates the number of intended recipients of the notification, and enters that number into the number set 44 for later use, as described below. A sender identity set 44 may contain the identity of the user 22 who created the notification, and information relating to the status and rights of that user 22. The status and rights of the user 22 would be obtained based on the code entered by the user 22 to access the CPU 26 in order to leave the notification. For example, the user identity set 44 may indicate that the user 22 is the principal of a school who would legitimately want to reach a large audience of parents of students at the school. Alternatively, the user identity set 44 may indicate that the user is a teacher of 8th grade, who would typically want to reach only the parents of students in her 8th grade class, or perhaps all the 8th grade students in the school, but whose legitimate interest would not include communicating with the parents of all the students at a school. Information indicating the class (or type) and the urgency of the notification may also be included in at least one of these data sets.

As noted above, the notification 32 may be created in a plurality of formats (e.g., .wav, .txt, .html, or .pdf). For example, the notification 32 may be created in at least one format, based on whether the notification is received via interface 24 as a voice notification, an email, a website, or a facsimile. Once the notification 32 is created in the appropriate plurality of formats (e.g., .wav, .txt, or .pdf) and is associated with the transmission data file 34 with its data sets, the CPU 26 stores the notification and associated data file in a delivery interface 46. The delivery interface 46 is configured to hold the notification in storage 48 until a triggering event occurs, as more fully described below.

When such triggering event occurs, the delivery interface 46 causes the notification to be distributed, according to known methods, to a mass of recipients, e.g. recipients 60-66 of FIG. 1. Within the delivery interface 46 in the CPU, each recipient of the notification has already been associated with a means of transmission according to a prior request made by each potential recipient to the management of the system. Thus, for example, recipient 60 may have requested to be associated with a means of transmission by facsimile, recipient 62 may be associated with a means of transmission by voicemail, recipient 64 may be associated with a means of transmission by e-mail, recipient 66 may be associated with a means of transmission by text message, or pager, and so on. Thus, the CPU 26 is configured to transmit the notification in appropriate format (e.g. .wav, .txt, .pdf) to each recipient, according to a known method. In certain embodiments, a means of transmission may be associated with the recipient based on a selection made by the user 22. For example, a user may choose to associate a recipient with voicemail if the notification 32 is urgent. In certain embodiments, a means of transmission may be automatically associated with the recipient based on the content of the notification 32. For example, if the notification 32 includes an image, then means of transmission may be facsimile or email.

The result is that, once the triggering event occurs, a single notification (having been delivered to the CPU 26 by an enabled user 22 possessing an access code) is eventually transmitted to masses of recipients identified by the user 22. This capability of the system places power in the hands of an institution or group of people to keep classes of citizens informed of events that are directly relevant to them on a real time basis.

In certain embodiments, the CPU 26 may store a request from a user 22 to store a notification in a database, instead of storing the notification in a local or remote memory associated with the CPU 26 as a notification file 32. In certain such embodiments, the notification may include an audio file in an appropriate format (e.g., .wav, .pcm, .mp3).

Moving now to a further aspect of the invention, reference to an example of a kind of problem that may be encountered will now be described. In a mass notification transmission system such as the one illustrated in FIG. 1, the personnel responsible for the oversight (e.g., command and control) of various notifications typically do not know what other institutions and agencies may be communicating to their constituents, and with what information. For example, the fire department may be communicating as well as the police about the same event, and a lack of coordination can create a problem. This problem has the potential to create duplicate pieces of information, inaccurate or misinformation, and/or outdated information for dissemination to the various constituents. Thus, there is a need to provide a system that displays aggregated information about current, future, and past notifications.

Figure 2:
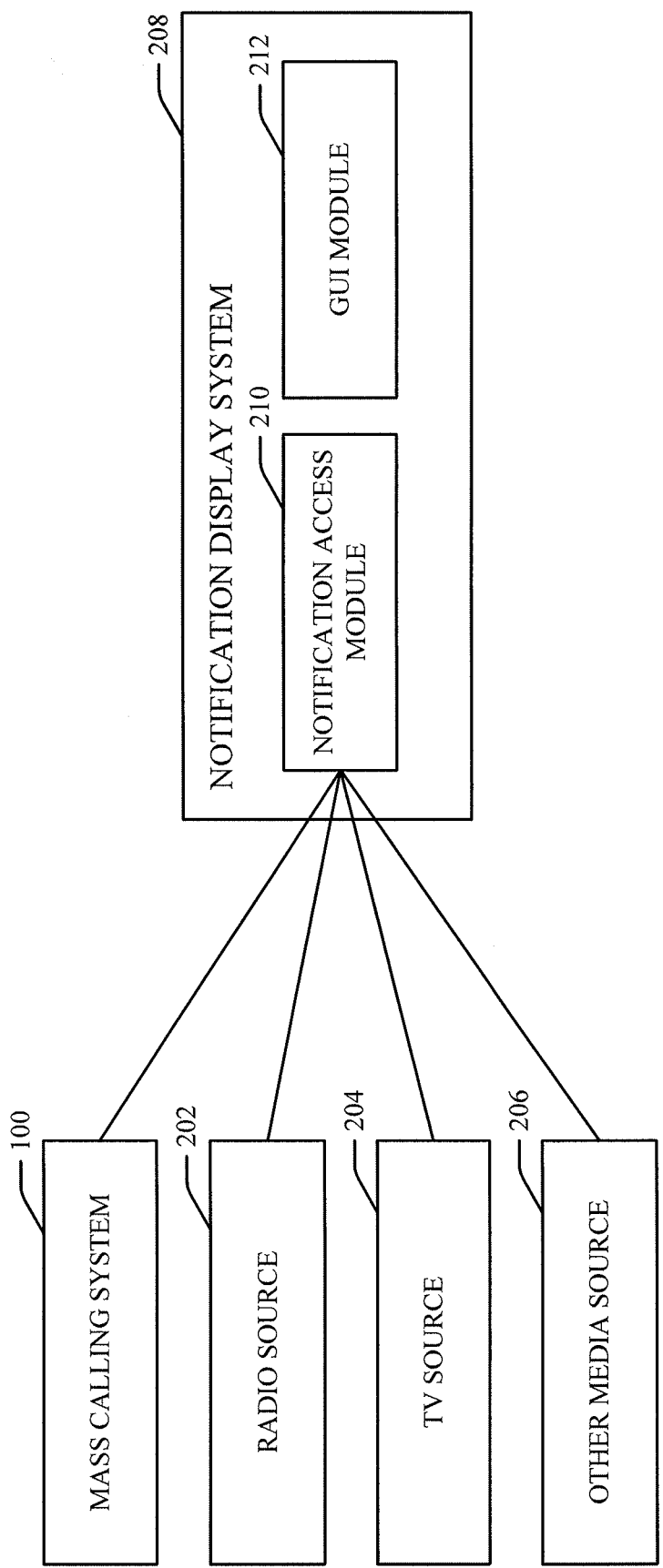
FIG. 2 is a diagram illustrating an example of a notification display system for displaying at least one notification from at least once source.

FIG. 2 is a diagram illustrating an example of a notification display system for displaying at least one notification from at least one source. As can be seen in FIG. 2, notification display system 208 may include a notification access module 210 for accessing notifications from different sources. For example, these sources may include, but are not limited to, alert and notification systems (e.g., mass notification transmission system 100 of FIG. 1), a radio source 202, a television (TV) source 204, another media source 206, or other information source (not illustrated).

As noted above with reference to FIG. 1, the notifications may be provided to a source (e.g., mass notification transmission system 100) by a user. For example, the notifications can be provided to the sources 100, 202-206 by users from institutions, agencies and/or companies. The notifications can include information including to the location/geography of the notification (e.g., state, city, school), and the content of the notification (e.g., "brush fire in effect, school to be let out early"). The notifications can include past, present and future notifications.

According to certain embodiments, the notifications may be directly accessed by notification access module 210 from a source, by directly interfacing with the source. For example, the notification may be accessed from an alert and notification system (e.g., mass notification transmission system 100 of FIG. 1). Examples of alert and notification systems include Connect-ED, Connect-CTY, emergency alerts systems (EAS) and National Oceanic and Atmospheric Administration (NOAA) systems. Notification access module 210 may interface directly with the alert and notification system to access data related to the notifications. Further, notification display system 208 may be incorporated within an alert and notification system.

According to another embodiment, the notifications may be accessed from a source via an RSS feed, which is a web feed format used to publish frequently updated content. According to yet another embodiment, the notifications may be accessed from a source via the Common Alerting Protocol (CAP), which is an XML-based data format for exchanging public warnings and emergencies between alerting technologies. CAP allows a warning notification to be retrieved simultaneously over many warning systems to many applications. For example, EAS may utilize CAP for warnings. Further, using CAP, standardized alerts from the United States Geological Survey, the Department of Homeland Security, the National Oceanic and Atmospheric Administration, and the California Office of Emergency Services can all be received in the same format, by the same application.

Figure 4:
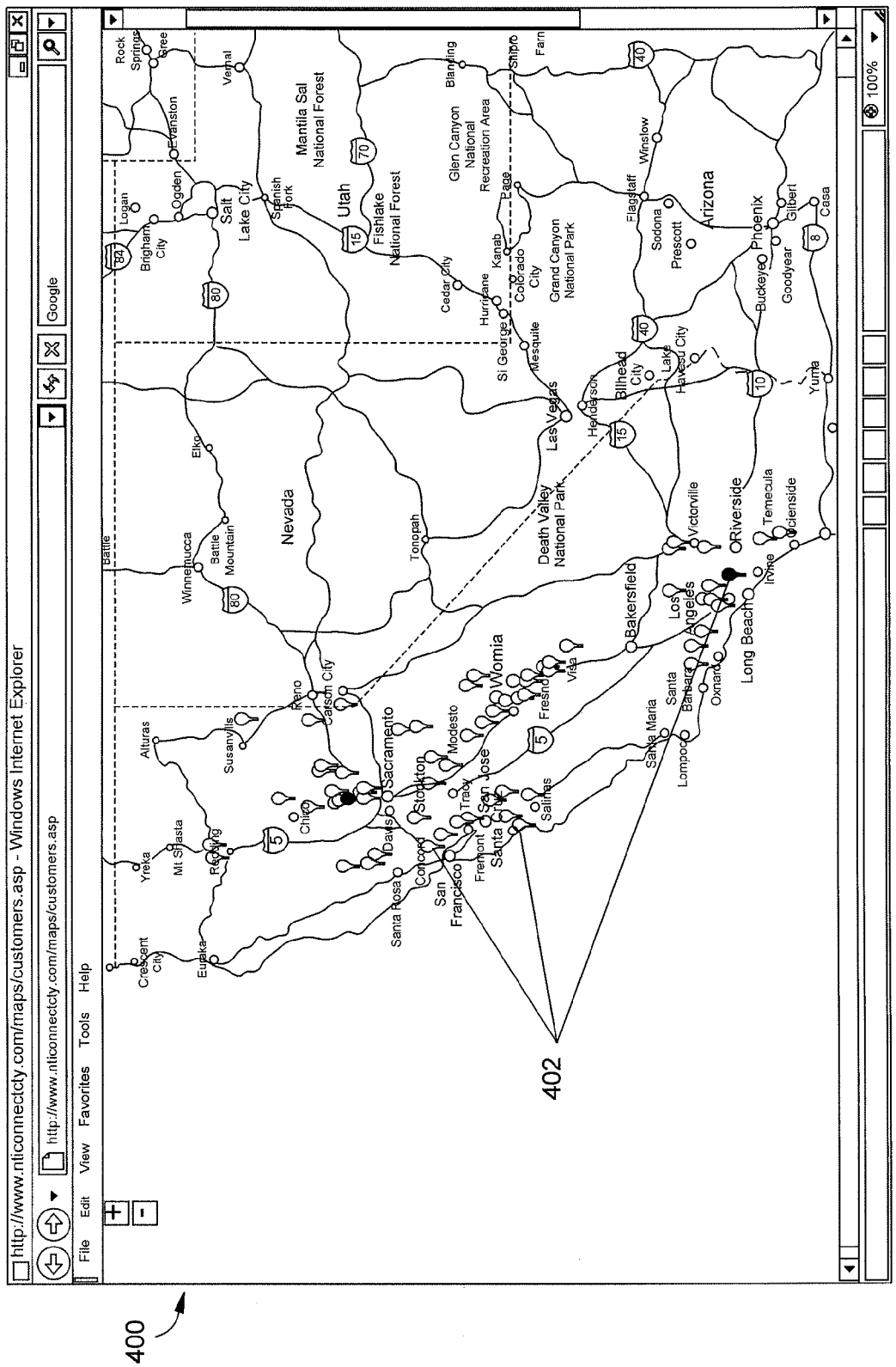
FIG. 4 is a screenshot illustrating the display of notifications from at least one source.
Figure 5:
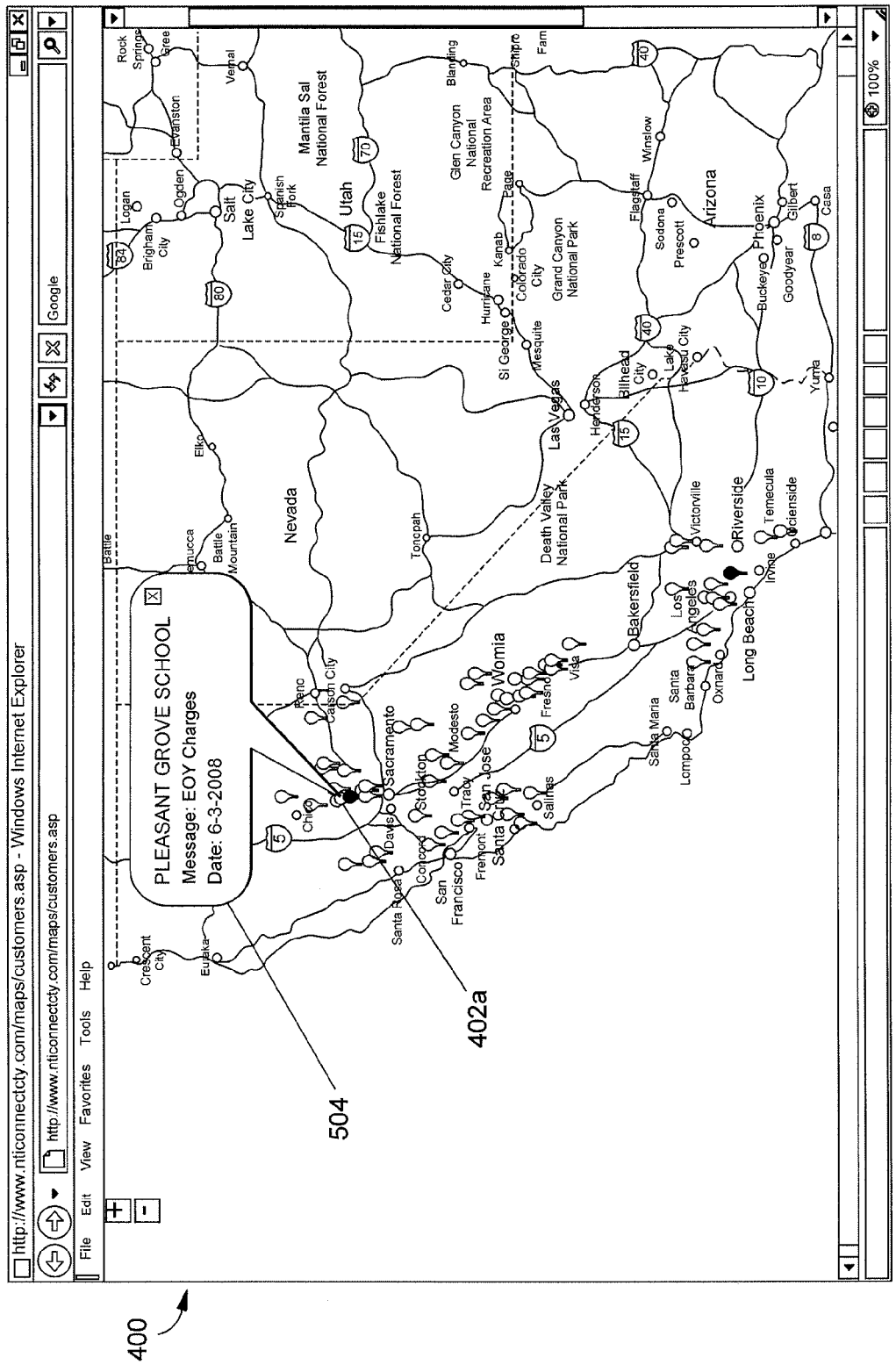
FIG. 5 is a screenshot further illustrating the display of notifications from at least one source.
Figure 6:
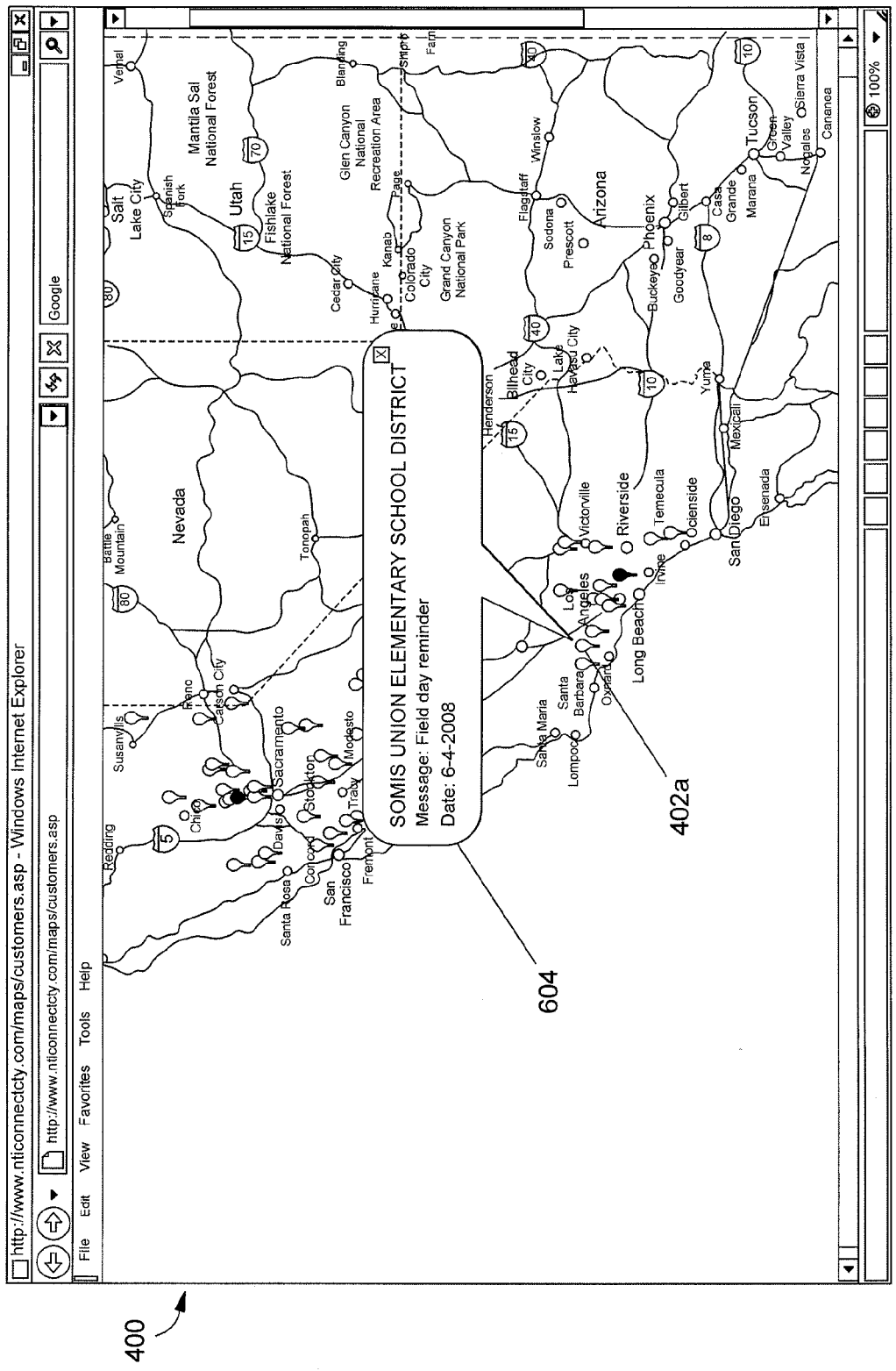
FIG. 6 is a screenshot further illustrating the display of notifications from at least one source.

Notification display system 208 may further include a GUI module 212 for displaying the accessed notifications in a graphical user interface (GUI). The GUI (not shown) may be displayed based on the geographical information associated with each notification (e.g., location set 40 of FIG. 1). Examples of displaying notifications in a GUI are shown in FIGS. 4 to 6. For example, location set 40 contains information relating to the geographical locations the notification is intended to reach such as street addresses. The notification display system 208 can use the street addresses to display the intended recipient locations of the notification. Alternatively, notification display system 208 may use other recipient data, such as a recipient's telephone number, to determine and associate a geographical location (such as a street address) with the telephone number.

FIG. 4 is a screenshot illustrating the display of notifications from at least one source. As can be seen in FIG. 4, a graphical user interface 400 is displayed with notifications for a particular geographical region (e.g., California). For example, the graphical user interface may be displayed by GUI module 212 of FIG. 2.

According to certain embodiments, the notifications may be displayed as indicators 402, which are positioned within GUI 400 based on the location/geography of the notification. Further, different shapes and/or colors can be used for indicators 402. Among other things, the different shapes and/or colors can be used to indicate the class (or type) and the urgency of the notification. Although FIG. 4 depicts notifications as indicators 402, it should be noted that the notifications can be displayed in other ways, such as text. Notifications can also be displayed according to other information, such as by user information (who selects to transmit the notification) or date, such as the time or time the notification was selected to be transmitted, the time the notification was transmitted, and the time the notification was determined to be received.

FIG. 5 is a screenshot further illustrating the display of notifications from at least one source. In addition to displaying an indicator for each notification, GUI 400 can also display the content of a notification. GUI 400 may be configured to show the content of a notification in response to a request at GUI 400 (e.g., by clicking on the indicator for a notification on GUI 400).

For example, upon clicking indicator 402a for a notification, GUI 400 may display the content 504 of that notification. In FIG. 5, the content 504 of the notification for indicator 402a includes reference to a location of "Pleasant Grove School," a notification of "EOY charges" and a date of Jun. 3, 2008. Of course, other configurations and fields for displaying content 404 of the notification can be used.

FIG. 6 illustrates another example of clicking on the indicator of a notification and displaying the associated content. More particularly, if a user clicks on indicator 402b for a notification, GUI 400 may display the content of that notification. In FIG. 6, the content 604 of the notification includes reference to a location of "Somis Union Elementary School District," a notification of "Field day reminder" and a date of Jun. 4, 2008.

Accordingly, GUI module 212 of FIG. 2 may display a graphical user interface (e.g., GUI 400), which includes a map. The GUI may display notifications (textually or visually) within the map, based on geographical information of each notification. Additionally, content information such as who, what, where, to whom, and the urgency of the notification may be displayed. Accordingly, GUI 400 is seen to display aggregate information for notifications from at least one source.

Figure 3:
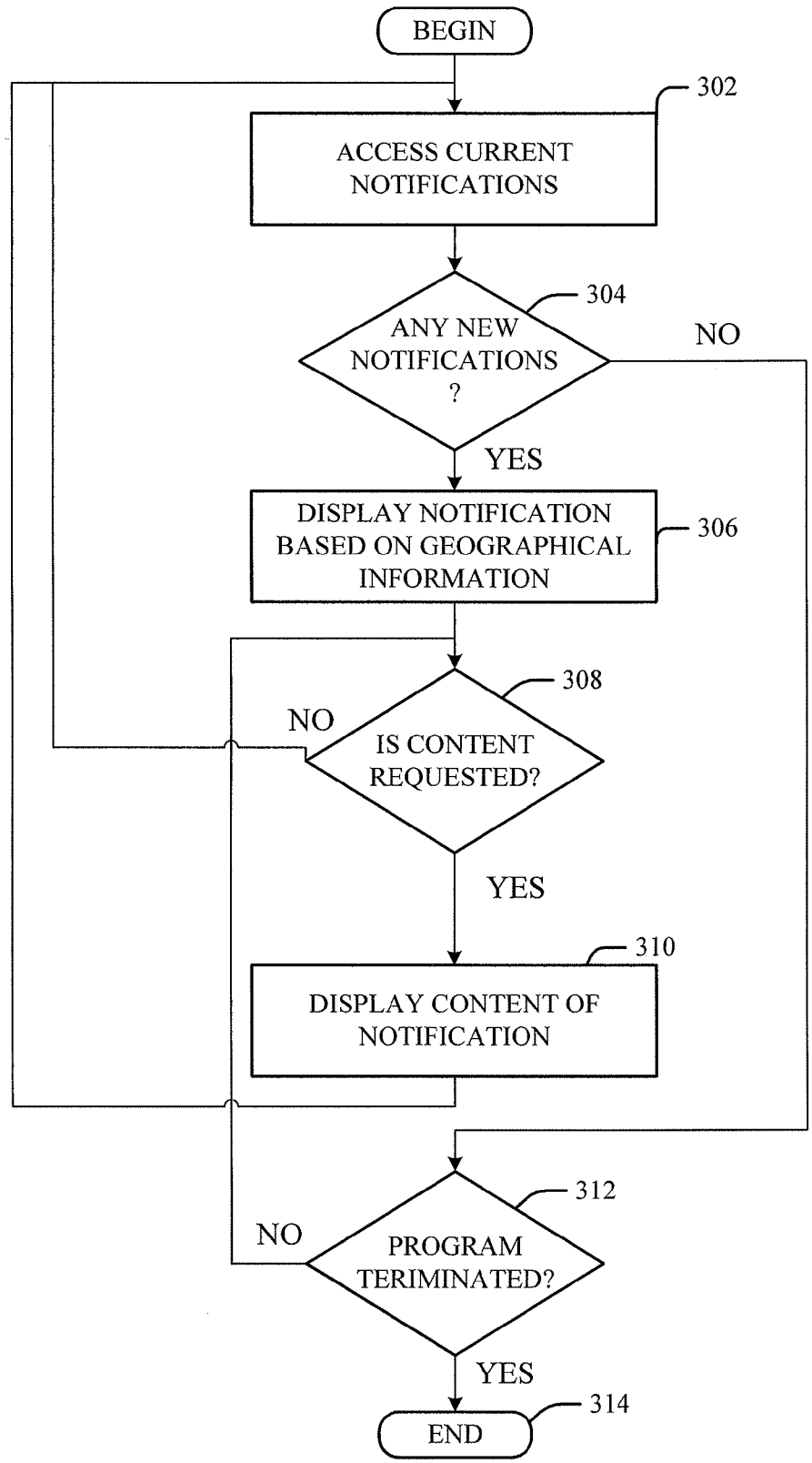
FIG. 3 is a flow chart illustrating an exemplary operation of displaying at least one notification from at least one source.

Having set forth by example the process by which notifications from one or more sources are displayed, reference to FIG. 3 shows this method in general form. More specifically, FIG. 3 is a flow chart illustrating an exemplary operation of displaying at least one notification from at least one source.

In step 302, current notifications from at least one source are accessed. The at least one source may be at least one of an alert and notification system, a radio source, a television source, another media type source, an XML RSS feed, or a data protocol format. The data protocol format may correspond with the Common Alerting Protocol (CAP). Further, the at least one notification may be provided to the at least one source by at least one of an institution, an agency and a company. In addition, the notifications may correspond to at least one of a past, present and future notification. In decision step 304, an inquiry is made as to whether there are any new notifications. If the answer to this question is yes, the process continues to step 306, but if the answer to the inquiry of decision step 304 is no, the process proceeds to step 312. In step 306, the notifications are displayed based on geographical information. Notifications may be displayed based on geographical information as discussed above, with reference to notification display system 208. The notification may further include class information, and the notifications may be displayed based on the class information, in addition to the geographical information. In decision step 308, an inquiry is made as to whether content of the notification is requested. If the answer to the above inquiry is no, the process returns to step 302. If the answer to this inquiry is yes, the content of the notification is displayed at step 310, and the process continues to step 312. In decision step 312, an inquiry is made as to whether the GUI program has been terminated. For example, the GUI program may be manually terminated by a user of the program. If the answer to this inquiry is yes, the process ends (end step 314). Otherwise, the process continues to monitor whether content is requested (decision step 308) and, if there is no such requested content, whether there are any new notifications (steps 302 and 304), until the program is terminated (decision step 312).

Figure 7:
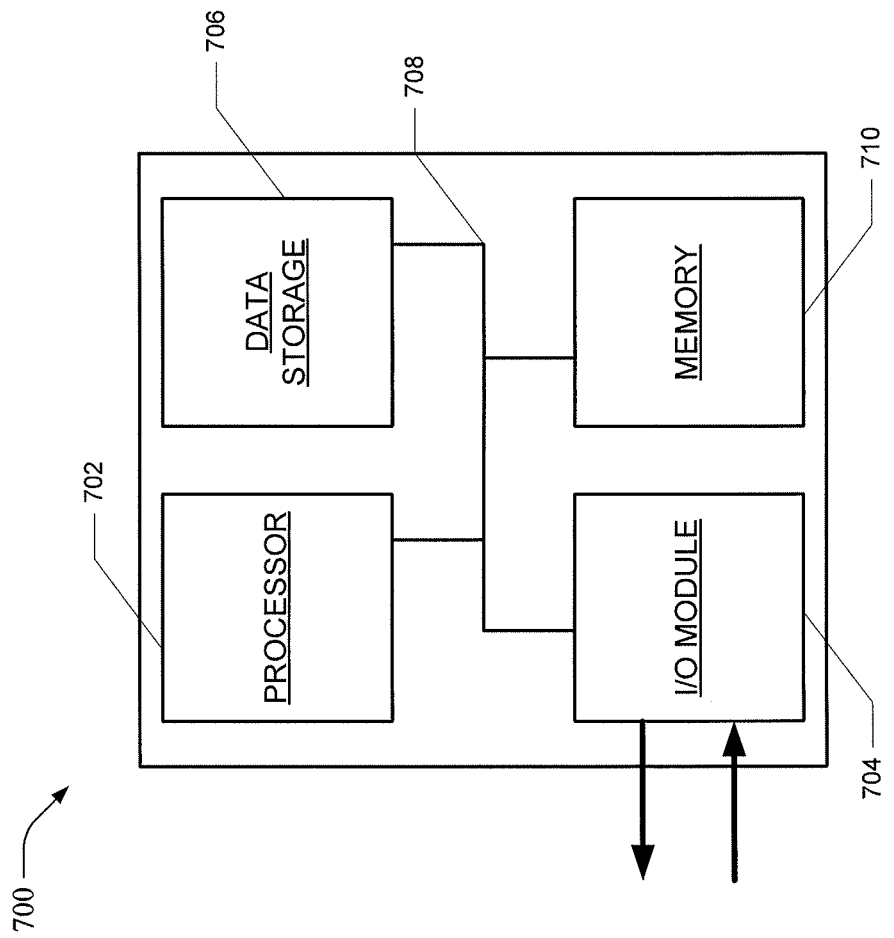
FIG. 7 is a block diagram illustrating an example of a computer system upon which may be used to display notifications from at least one source.

FIG. 7 is a block diagram that illustrates a computer system 700 upon which an embodiment of the present disclosure may be implemented in accordance with certain aspects of the present disclosure. Computer system 700 includes a bus 708 or other communication mechanism for communicating information, and a processor 702 coupled with bus 708 for processing information. Computer system 700 also includes a memory 710, such as a random access memory ("RAM") or other dynamic storage device, coupled to bus 708 for storing information and instructions to be executed by processor 702. Memory 710 may also be used for storing temporary variable or other intermediate information during execution of instructions to be executed by processor 702. Computer system 700 further includes a data storage device 706, such as a magnetic disk or optical disk, coupled to bus 708 for storing information and instructions.

Computer system 700 may be coupled via I/O module 704 to a display device, such as a cathode ray tube ("CRT") or liquid crystal display ("LCD") for displaying information to a computer user. An input device, such as, for example, a keyboard or a mouse may also be coupled to computer system 700 via I/O module 704 for communicating information and command selections to processor 702.

According to certain aspects of the present disclosure, the display of notifications from at least one source may be implemented using a computer system 700 in response to processor 702 executing one or more sequences of one or more instructions contained in memory 710. Such instructions may be read into memory 710 from another machine-readable medium, such as data storage device 706. Execution of the sequences of instructions contained in main memory 710 causes processor 702 to perform the process steps described herein. One or more processors in a multi-processing arrangement may also be employed to execute the sequences of instructions contained in memory 710. In alternative embodiments, hard-wired circuitry may be used in place of or in combination with software instructions to implement various embodiments of the present disclosure. Thus, embodiments of the present disclosure are not limited to any specific combination of hardware circuitry and software.

The term "machine-readable medium" as used herein refers to any medium that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 706. Transmission media include coaxial cables, copper wire, and fiber optics, including the wires that comprise bus 708. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A system for displaying plural notifications from plural sources, the system comprising a processor configured to:

access the plural notifications from the plural sources, the plural notifications comprising content and associated with a street address for at least one of a plurality of recipients;

provide a first notification and a second notification for display, wherein the first notification is for at least two recipients from the plurality of recipients; and concurrently display at least two indicators for the first notification, one indicator for each of the at least two recipients, positioned on a map based on the street address for at least one of the at least two recipients, and a third indicator for the second notification, wherein additional information for the first notification is provided for display upon selection of at least one of the two displayed indicators for the first notification positioned on the map, the additional information for the first notification comprising an identification that the first notification is a past notification based on the time the notification was transmitted or a present notification selected for transmission, and, wherein additional information for the second notification is provided for display upon selection of the third indicator and comprises an identification that the second notification is a future notification selected for transmission at a time the notification was selected to be transmitted.

2. The system of claim 1, wherein at least one source from the plural sources is at least one of an alert and notification system, a radio source, a television source, an XML RSS feed, or a data protocol format.

3. The system of claim 2, wherein the data protocol format comprises the Common Alerting Protocol (CAP).

4. The system of claim 1, wherein the plural notifications is provided to at least one source from the plural sources by at least one of an institution, an agency or a company.

5. The system of claim 1, wherein the processor is further configured to:
displaying the content of the first notification in response to a request for the content.

6. The system of claim 1, wherein the first notification further comprises class information.

7. The system of claim 6, wherein the processor is further configured to:
display the first notification on the map based on the class information of the notification.

8. The system of claim 1, wherein the additional information for each indicator comprises at least one of a class of the corresponding notification or an urgency of the corresponding notification.

9. A method for displaying plural notifications from at least one source from among a plurality of sources, comprising:

accessing the plural notifications from the at least one source from among the plurality of sources, the plural notifications comprising content and associated with a street address for at least one of a plurality of recipients;

providing a first notification and a second notification for display, wherein the first notification is for at least two recipients from the plurality of recipients; and concurrently displaying at least two indicators for the first notification, one indicator for each of the at least two recipients, positioned on a map based on the street address for at least one of the at least two recipients, and a third indicator for the second notification, wherein additional information for the first notification is provided for display upon selection of at least one of the two displayed indicators for the first notification positioned on the map, the additional information for the first notification comprising an identification that the first notification is a past notification based on the time the notification was transmitted or a present notification selected for transmission, and, wherein additional information for the second notification is provided for display upon selection of the third indicator and comprises an identification that the second notification is a future notification selected for transmission at a time the notification was selected to be transmitted.

10. The method of claim 9, wherein the at least one source is at least one of an alert and notification system, a radio source, a television source, an XML RSS feed, or a data protocol format.

11. The method of claim 10, wherein the data protocol format comprises the Common Alerting Protocol (CAP).

12. The method of claim 9, wherein the plural notifications is provided to the at least one source by at least one of an institution, an agency or a company.

13. The method of claim 9, further comprising:
displaying the content of the first notification in response to a request for the content.

14. The method of claim 9, wherein the first notification further comprises class information.

15. The method of claim 14, further comprising:
displaying the first notification on the map based on the class information of the notification.

16. A non-transitory machine-readable medium encoded with instructions for displaying plural notifications from at least one source from among a plurality of sources, the instructions comprising code for:

accessing the plural notifications from the at least one source from among the plurality of sources, the plural notifications comprising content and associated with a street address for at least one of a plurality of recipients;

providing a first notification and a second notification for display, wherein the first notification is for at least two recipients from the plurality of recipients; and concurrently displaying at least two indicators for the first notification, one indicator for each of the at least two recipients, positioned on a map based on the street address for at least one of the at least two recipients, and a third indicator for the second notification, wherein additional information for the first notification is provided for display upon selection of at least one of the two displayed indicators for the first notification positioned on the map, the additional information for the first notification comprising an identification that the first notification is a past notification based on the time the notification was transmitted or a present notification selected for transmission, and, wherein additional information for the second notification is provided for display upon selection of the third indicator and comprises an identification that the second notification is a future notification selected for transmission at a time the notification was selected to be transmitted.

17. The non-transitory machine-readable medium of claim 16, wherein the at least one source is at least one of an alert and notification system, a radio source, a television source or an XML RSS feed.

* * * * *